(12) United States Patent
Greiter

(10) Patent No.: US 12,215,778 B2
(45) Date of Patent: Feb. 4, 2025

(54) LUBRICANT SUPPLY SYSTEM FOR A DRIVE UNIT OF AN ELECTRICALLY OPERATED VEHICLE

(71) Applicant: AUDI AG, Ingolstadt (DE)

(72) Inventor: Ivo Greiter, Eitensheim (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 18/561,903

(22) PCT Filed: May 5, 2022

(86) PCT No.: PCT/EP2022/062104
§ 371 (c)(1),
(2) Date: Nov. 17, 2023

(87) PCT Pub. No.: WO2022/243045
PCT Pub. Date: Nov. 24, 2022

(65) Prior Publication Data
US 2024/0229924 A1 Jul. 11, 2024

(30) Foreign Application Priority Data
May 19, 2021 (DE) ..................... 10 2021 112 967.2

(51) Int. Cl.
*F16H 57/04* (2010.01)
(52) U.S. Cl.
CPC ..... *F16H 57/0483* (2013.01); *F16H 57/0441* (2013.01); *F16H 57/0476* (2013.01)
(58) Field of Classification Search
CPC ............. F16H 57/0483; F16H 57/0441; F16H 57/0476; F16H 57/045; F16H 57/04
See application file for complete search history.

(56) References Cited

U.S. PATENT DOCUMENTS

| | | | |
|---|---|---|---|
| 7,578,761 B2 * | 8/2009 | Nishikawa | B60K 6/44 475/116 |
| 8,909,402 B2 * | 12/2014 | Miyamoto | H02K 9/193 903/902 |

(Continued)

FOREIGN PATENT DOCUMENTS

| | | |
|---|---|---|
| DE | 10 2013 211 225 A1 | 12/2014 |
| DE | 10 2015 214 309 A1 | 2/2017 |

(Continued)

OTHER PUBLICATIONS

International Search Report dated Aug. 8, 2022 for International Application No. PCT/EP2022/062104.

(Continued)

*Primary Examiner* — Michael A Riegelman
(74) *Attorney, Agent, or Firm* — STAAS & HALSEY LLP

(57) ABSTRACT

A lubricant supply system, for a drive apparatus of an electrically operated vehicle having at least one electric machine which outputs power to at least one vehicle wheel via a gear mechanism arrangement, includes an electric machine hydraulic circuit in which a lubricant tank is connected via a suction line to a pressure pump which conveys lubricant to the electric machine via an electric machine supply line, and includes a gear mechanism hydraulic circuit, via which lubricant can be conveyed to the gear mechanism arrangement. The pressure pump is associated as a common pressure pump with both the electric machine hydraulic circuit and the gear mechanism hydraulic circuit so that lubricant during pump operation can be recirculated both in the electric machine hydraulic circuit and in the gear mechanism hydraulic circuit.

20 Claims, 2 Drawing Sheets

(56) References Cited

U.S. PATENT DOCUMENTS

| | | | |
|---|---|---|---|
| 10,920,836 B2* | 2/2021 | Möhlmann | F16H 48/12 |
| 11,231,103 B2* | 1/2022 | Staake | F16H 57/0441 |
| 11,370,293 B2* | 6/2022 | Merz | F16H 57/0436 |
| 11,486,488 B2* | 11/2022 | Helle | F04B 23/02 |
| 11,725,721 B2* | 8/2023 | Torii | B60K 6/383 |
| | | | 184/6.12 |
| 11,987,113 B2* | 5/2024 | Hwang | B60K 11/02 |
| 12,038,082 B1* | 7/2024 | Ma | F16H 57/0476 |
| 2004/0129475 A1* | 7/2004 | Forsyth | F16H 48/08 |
| | | | 180/233 |
| 2005/0023102 A1* | 2/2005 | Brissenden | B60K 17/3467 |
| | | | 192/85.63 |
| 2006/0223670 A1* | 10/2006 | Nishikawa | B60K 6/44 |
| | | | 123/196 R |
| 2008/0182712 A1* | 7/2008 | Kira | B60K 17/356 |
| | | | 477/7 |
| 2017/0191551 A1* | 7/2017 | Staake | F16H 3/66 |
| 2019/0120369 A1* | 4/2019 | Staake | F16H 57/045 |
| 2019/0145470 A1* | 5/2019 | Möhlmann | F16D 25/0638 |
| | | | 192/85.61 |
| 2021/0006132 A1* | 1/2021 | Steinz | F16H 57/0417 |
| 2021/0039491 A1* | 2/2021 | Merz | F16H 57/04 |
| 2023/0341044 A1* | 10/2023 | Greiter | F16H 57/0476 |
| 2023/0344312 A1* | 10/2023 | Greiter | H02K 7/006 |
| 2024/0026968 A1* | 1/2024 | Greiter | F16H 57/0457 |
| 2024/0146155 A1* | 5/2024 | Greiter | H02K 9/197 |
| 2024/0229924 A1* | 7/2024 | Greiter | F16H 57/0473 |

FOREIGN PATENT DOCUMENTS

| | | |
|---|---|---|
| DE | 10 2016 211 226 B3 | 6/2017 |
| DE | 10 2016 110 915 A1 | 12/2017 |
| DE | 10 2018 209 340 B3 | 4/2019 |
| DE | 10 2018 211 359 A1 | 1/2020 |
| DE | 10 2018 211 356 B4 | 10/2020 |
| JP | 2006312353 A | 11/2006 |

OTHER PUBLICATIONS

German Office Action dated Dec. 7, 2021 for German Application No. 10 2021 112 967.2.

German Office Action dated Apr. 7, 2022 for German Application No. 10 2021 112 967.2.

PCT/EP2022/062104, May 5, 2022, Ivo Greiter, Audi AG.

10 2021 112 967.2, May 19, 2021, Ivo Greiter, Audi AG.

* cited by examiner

LUBRICANT SUPPLY SYSTEM FOR A DRIVE UNIT OF AN ELECTRICALLY OPERATED VEHICLE

CROSS REFERENCE TO RELATED APPLICATIONS

This application is a U.S. national stage of International Application No. PCT/EP2022/062104, filed on May 5, 2022. The International Application claims the priority benefit of German Application No. 10 2021 112 967.2 filed on May 19, 2021. Both the International Application PCT/EP2022/062104 and the German Application No. 10 2021 112 967.2 are incorporated by reference herein in their entirety.

BACKGROUND

Disclosed herein is a lubricant supply system for a drive apparatus of an electrically operated vehicle.

In an electrically operated, two-track vehicle, for example, an electrically driven front axle may have an electric machine. This electric machine may be freely arranged, where applicable, for example, in an axially parallel manner relative to the flange shafts which are guided relative to the vehicle wheels. In this case, the electric machine can output power via a single or double spur pinion gear stage to a front axle differential and onward to the flange shafts, which are guided relative to the vehicle wheels, of the vehicle front axle.

DE 10 2018 211 359 A1 discloses a generic lubricant supply system for a drive apparatus which has an electric machine. This electric machine can output power via a gear mechanism arrangement to at least one vehicle wheel. The lubricant supply system has an electric machine hydraulic circuit in which any lubricant reservoir, for example, a lubricant tank, is connected to a pressure pump via a suction line. The pressure pump can supply the gear mechanism arrangement with lubricant via a gear mechanism supply line. Furthermore, the lubricant supply system has an electric machine hydraulic circuit which conveys lubricant as far as the electric machine via an electric machine supply line.

In the above DE 10 2018 211 359 A1, the gear mechanism supply line is completely decoupled in technical flow terms from the electric machine supply line. Therefore, the electric machine hydraulic circuit and the gear mechanism hydraulic circuit are functionally independent from each other. Such a construction of the lubricant supply system is connected with a high component complexity and a complicated lubricant channel guide.

DE 10 2013 211 225 A1 discloses a hybrid drive arrangement. DE 10 2018 211 356 B4 discloses a lubricant supply system for a drive apparatus of an electrically operated vehicle. DE 10 2015 214 309 A1 discloses a hollow shaft cooling system for a drive of an electric vehicle. DE 10 2018 209 340 B3 discloses an operating strategy for a multi-phase system inverter of an electric drive unit for a motor vehicle.

SUMMARY

An aspect of the invention is to provide a lubricant supply system for a drive apparatus of an electrically operated vehicle, in which in comparison with the prior art the component complexity and the construction complexity are reduced.

A lubricant supply system includes an electric machine hydraulic circuit. A lubricant tank is connected to a pressure pump via a suction line in the electric machine hydraulic circuit. The pressure pump can convey lubricant as far as the electric machine via an electric machine supply line. Furthermore, the lubricant supply system has a gear mechanism hydraulic circuit, via which lubricant can be conveyed as far as the gear mechanism arrangement. With regard to a reduced component complexity and a constructively simple configuration, according to an aspect of the invention the pressure pump is in the form of a common pressure pump for both the electric machine hydraulic circuit and the gear mechanism hydraulic circuit. In this manner, the lubricant during pump operation can at the same time be recirculated both in the electric machine hydraulic circuit and in the gear mechanism hydraulic circuit.

In order to allow a selective lubrication of gear mechanism components a dry sump lubrication is carried out by the gear mechanism hydraulic circuit. The lubricant can be guided in at least one gear mechanism supply line to at least one gear mechanism lubrication location. It should be emphasized that an example of the invention is not limited in any way to such a dry sump lubrication. Alternatively and/or additionally, a wet sump lubrication can also be carried out. In a technical implementation, a pressure line can lead away from the pressure pump and can branch out at a branching location into the electric machine supply line and the gear mechanism supply line.

Furthermore, a lubricant sump and a return pump are associated as common components with the electric machine hydraulic circuit and the gear mechanism hydraulic circuit. During pump operation, the lubricant which drips from the gear mechanism lubrication location can be collected in the lubricant sump. At the same time, the lubricant which flows out of the electric machine can also be collected in the lubricant sump. From there, the lubricant is guided back by the return pump into the lubricant tank. With regard to further reduction of the component complexity, it is preferable for the pressure pump and the return pump to be integrated in a double pump with a common drive pump. The common drive pump can be in driving connection with an electric motor. The electric motor can be controlled by an electronic pump control device depending on the cooling/lubricating requirement.

In a specific variant, the gear mechanism arrangement can have an axle differential which is drivingly connected to vehicle wheels at the output at both sides via flange shafts. One of the two flange shafts can be divided into a shaft portion on the wheel and a shaft portion on the axle. They may be able to be connected to each other via a separation clutch.

In the above variant, the lubricant supply system additionally includes a separation clutch hydraulic circuit via which the separation clutch can be supplied with lubricant. The lubricant can then be guided in at least one separation clutch supply line to the separation clutch. With regard to a further reduction in components, the pressure pump also works for the separation clutch hydraulic circuit. In this case, the lubricant is also additionally recirculated in the separation clutch hydraulic circuit during pump operation.

The separation clutch supply line can be connected downstream of the common pressure pump. For example, the pressure line, the gear mechanism supply line or the electric machine supply line may have a branching location from which the separation clutch supply line branches. The lubricant which flows away from the separation clutch can be collected in the common lubricant sump.

An internal lubrication of the separation clutch can be carried out by the separation clutch hydraulic circuit. In this case, a lubricant channel which opens at a front side of the shaft portion in a clutch chamber of the separation clutch will then be constructed in one of the shaft portions. The lubricant inlet into the clutch chamber is therefore from a radially internal location so that using the centrifugal force to distribute in a radially outward direction is ensured, whereby correct lubrication of all the clutch components of the separation clutch is ensured.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION

Figure 1:
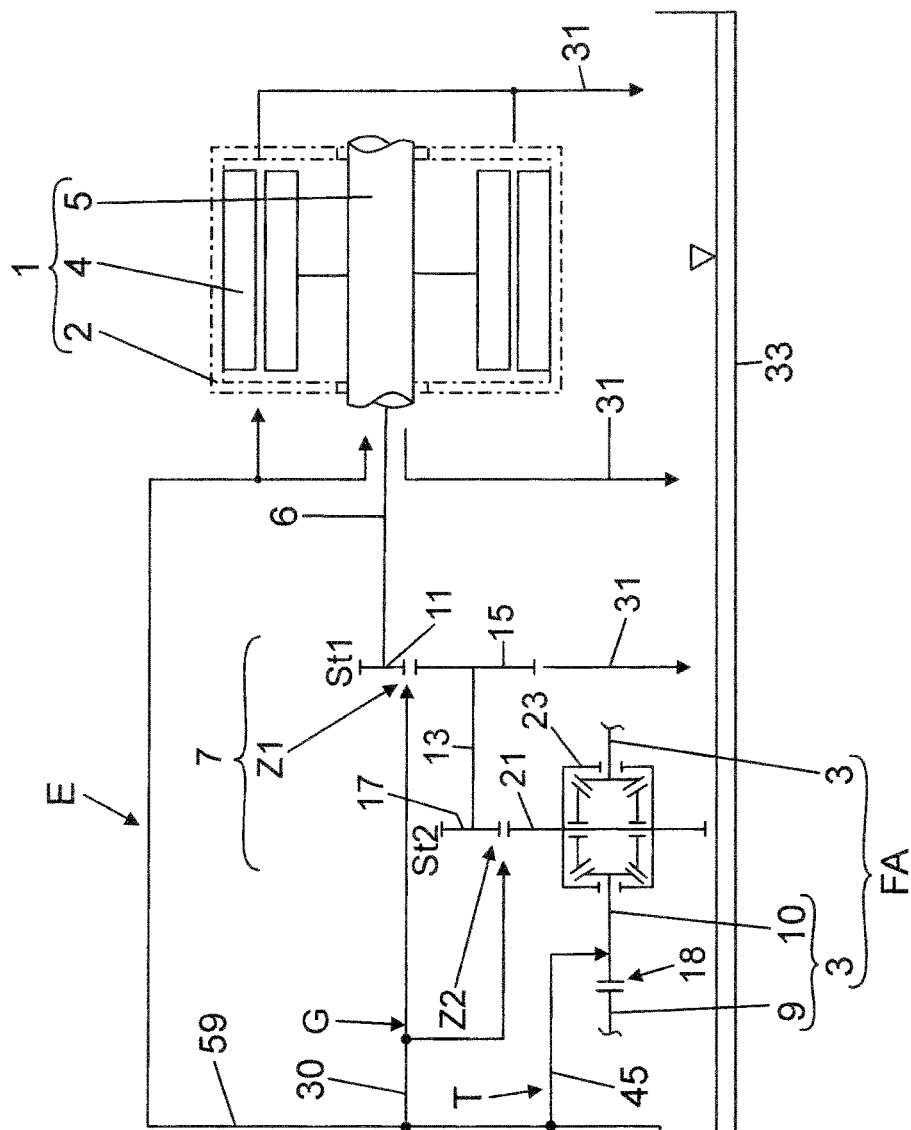
FIG. 1 shows a block diagram of an electrically driven vehicle axle of a vehicle with an associated lubricant supply system.

Reference will now be made in detail to the preferred embodiments, examples of which are illustrated in the accompanying drawings, wherein like reference numerals refer to like elements throughout.

In FIG. 1, an electrically driven vehicle axle FA of a two-track vehicle is indicated by way of example. The vehicle axle FA has an electric machine 1 which is arranged with transverse installation axially parallel with the flange shafts 3 which are guided relative to the vehicle wheels. The left flange shaft 3 is divided into a shaft portion 9 on the wheel and a shaft portion 10 on the axle. The two shaft portions 9, 10 of the flange shaft 3 can be connected to each other or disconnected from each other via a separation clutch 18. A stator 4 having a cooperating rotor hollow shaft 5 is arranged in a housing 2 of the electric machine 1.

The rotor hollow shaft 5 of the electric machine 1 is connected in a rotationally secure manner via an aligned gearing arrangement, which is not shown, to a gear mechanism input shaft 6 of a gear mechanism arrangement 7 which outputs power to both flange shafts 3. In FIG. 1, the gear mechanism arrangement 7 has a double spur pinion stage in which in a first gear stage St1 a fixed gear 11 which is arranged on the gear mechanism input shaft 6 is in tooth engagement with a fixed gear 15 which is arranged on an intermediate shaft 13. An additional fixed gear 17 which meshes with a gear 21 of an axle differential 23 at the input so as to form a second spur pinion stage St2 is arranged on the intermediate shaft 13. The axle differential 23 outputs power at both sides to the flange shafts 3 which are guided relative to the vehicle wheels.

In FIG. 1, the electrically driven vehicle axle FA is associated with a lubricant supply system, the structure of which is described below. Consequently, the lubricant supply system has an electric machine hydraulic circuit E, a gear mechanism hydraulic circuit G and a separation clutch hydraulic circuit T. The following common hydraulic components are associated with the gear mechanism hydraulic circuit G, electric machine hydraulic circuit E and separation clutch hydraulic circuit T, that is an oil tank 25, a pressure pump 29, an oil sump 33 and a return pump 35. The oil tank 25 is connected via a suction line 27 to the pressure pump 29. There leads away from the pressure pump 29 a pressure line 32, from which at a first branching location 19 a separation clutch supply line 45 which leads up to the separation clutch 18 branches. At a second branching location 26, an electric machine supply line 59 which leads up to the electric machine 1 branches off and a gear mechanism supply line 30 which leads to tooth engagement locations Z1, Z2 of the gear mechanism arrangement 7 branches off.

During introduction of a gear mechanism dry sump lubrication, the oil 31 which is introduced from the oil tank 25 is guided via the pressure line 32 and via the gear mechanism supply line 30 to the tooth engagement locations Z1, Z2 of the gear mechanism arrangement 7. From the tooth engagement locations Z1, Z2, the oil 31 can drip off and be collected in the oil sump 33. From there, the oil 31 is guided back by the return pump 35 in a return line 37 into the oil tank 25. The oil tank 25 is configured in a hermetically fluid-tight manner in an outward direction. A venting line 39, by which the tank interior 41 is connected above an oil level 43 toward the exterior of the tank is provided for venting the oil tank 25. The return line 37 is connected in FIG. 1 to a rising pipe 53 which extends vertically upward and which projects above the oil level 43 with a projection and which forms at the upper end thereof a free overflow, via which returned oil 31 can flow into the oil tank 25 in a foam-free manner.

According to FIG. 1, the oil tank 25, the pressure pump 29, the oil sump 33 and the return line 37 together with the return pump 35 are incorporated in the electric machine hydraulic circuit E. By the pressure pump 29, the oil 31 is guided via the pressure line 32 and the electric machine supply line 59 as far as the electric machine 1. The oil 31 which flows away from the electric machine 1 is collected in the oil sump 33 and is guided from there back into the oil tank 25 by the return pump 35 in the return line 37. The oil tank 25, the pressure pump 29, the oil sump 33 and the return line 37 together with the return pump 35 are also incorporated in the separation clutch hydraulic circuit T. By the pressure pump 29, the oil 31 is guided via the pressure line 32 and the separation clutch supply line 45 as far as the electric machine 1. The oil 31 which flows away from the electric machine 1 is collected in the oil sump 33 and is guided from there back into the oil tank 25 by the return pump 35 in the return line 37.

In FIG. 1, the pressure pump 29 and the return pump 35 form a double pump 58 with a common drive shaft 61. The common drive shaft 61 is drivingly connected to an electric motor 63 which acts as a servomotor.

In FIG. 1, the electric motor 63 is connected in terms of signaling to an electronic pump control device 47. The electronic pump control device 47 establishes in accordance with travel operation parameters whether there is a cooling/lubricating requirement in the gear mechanism arrangement 7 and/or in the electric machine 1. If a cooling/lubricating requirement is present, the pump control device 65 activates the double pump 58.

In FIG. 1, the oil tank 25 is arranged geodetically above the oil sump 33 by a height offset. On the tank base, the oil tank 25 has an oil outflow 67 from which a small oil volume flow permanently flows out directly into the oil sump 33 under the action of gravitational force.

During normal travel operation with an activated double pump 58, both in the electric machine hydraulic circuit E, in the gear mechanism hydraulic circuit G and in the separation clutch hydraulic circuit T an oil recirculation is carried out. That is to say that the lubricant locations Z1, Z2 are supplied via the gear mechanism supply lines with oil which subsequently drips into the oil sump 33.

At the same time, the electric machine 1 is supplied via the electric machine supply line 59 with oil which subsequently drips into the oil sump 33 again. Furthermore, the separation clutch is supplied via the separation clutch supply line 45 with oil which is also collected in the oil sump 33 again.

The electric machine 1 is in the form of a wet-running electric machine, in which the oil 31 brings about not only a rotor internal cooling but additionally also cools the windings of the electric machine 1.

Figure 2:
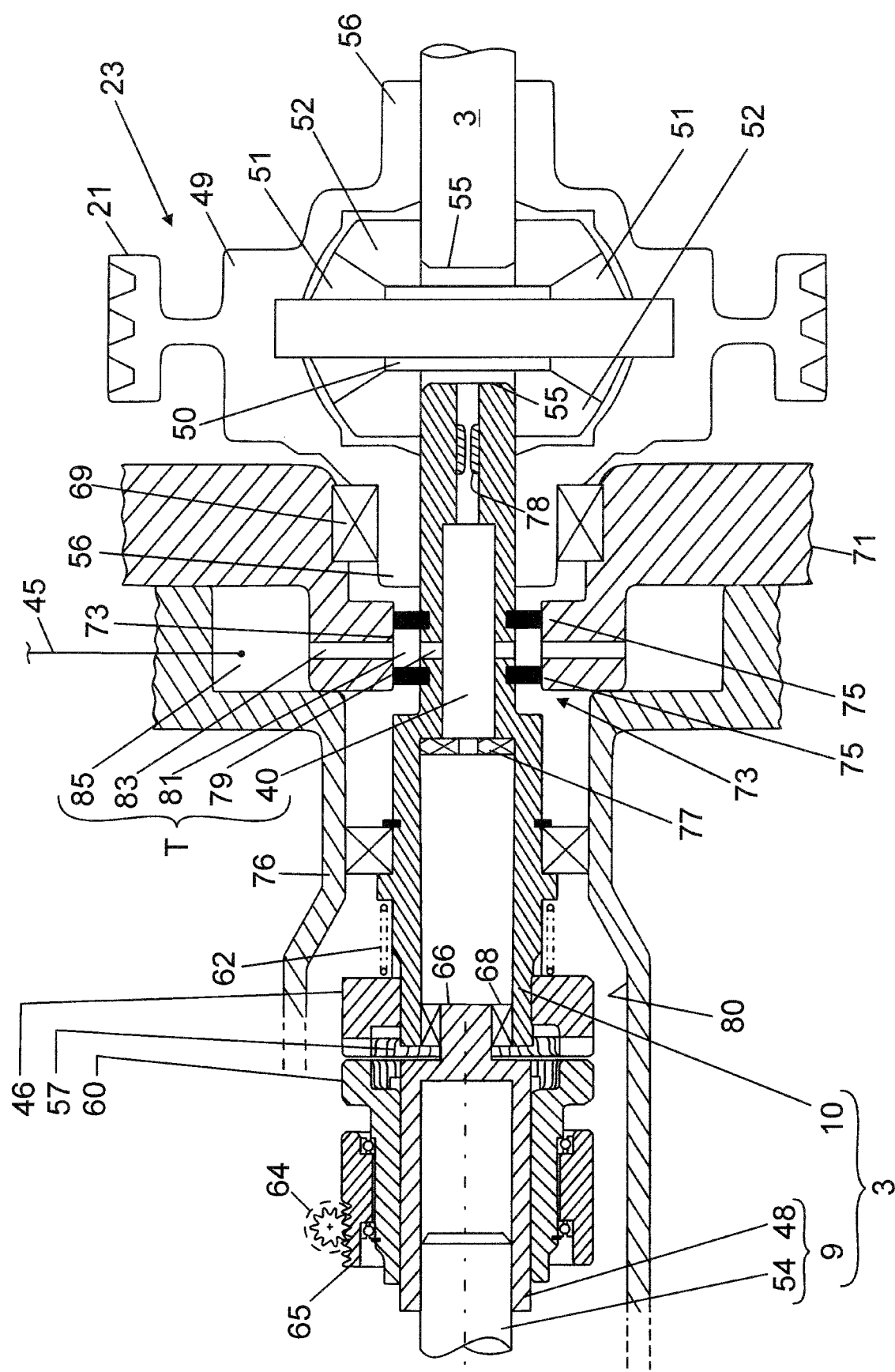
FIG. 2 shows an enlarged partial sectioned view of the vehicle axle.

In FIG. 1, the separation clutch supply line 45 is guided as far as a lubricant supply location of the separation clutch 18. The separation clutch hydraulic circuit T is configured in FIG. 2 by way of example so that not only an internal lubrication of the separation clutch 18 but also an internal lubrication of the axle differential 23 is carried out Below, the gear mechanism structure of the vehicle axle FA shown in FIG. 2 is described: accordingly, the axle differential 23 has a compensation housing 49, in the housing interior 50 of which two compensation bevel gears 51 which are coaxially opposite each other with spacing are rotatably supported. The two compensation bevel gears 51 are rotatably supported on an axle differential pin which is connected to the compensation housing 49 in a rotationally secure manner. Furthermore, two axle bevel gears 52 which are coaxially opposite each other with spacing are rotatably supported in the housing interior 50 of the compensation housing 49. They are arranged at right-angles to the compensation bevel gears 51. Each axle bevel gear 52 is in tooth engagement with the two compensation bevel gears 51. As can be seen in FIG. 2, the left axle bevel gear 52 is located on the shaft portion 10 of the left flange shaft 3 on the axle while the right axle bevel gear 52 is located on the right flange shaft 3. The shaft portion 10 and the right flange shaft 3 each project with the front sides 55 thereof into the housing interior 50. Furthermore, the shaft portion 10 of the left flange shaft 3 is guided by a hub portion 56 of the compensation housing 49 out of the housing in the direction toward the separation clutch 18.

It should be emphasized that an example of the invention is not limited to such a bevel gear differential but can instead be applied to other differentials, for example, a spur pinion differential.

As can further be seen in FIG. 2, the shaft portion 9 of the left flange shaft 3 on the wheel is constructed from an intermediate shaft 48 which is at the vehicle interior in the transverse vehicle direction y and an articulated shaft 54 which leads to the vehicle wheel. The intermediate shaft 48 is connected to the articulated shaft 54 via an insertion tooth arrangement.

In FIG. 2, the shaft portion 10 on the axle is spaced apart from the intermediate shaft 48 when viewed in the axial direction via a clutch chamber 57 of the separation clutch 18. In FIG. 2, the separation clutch 18 is in the form of a claw type clutch which has switching claws on the axle and switching claws on the wheel which are connected to each other in a positive-locking manner when the separation clutch 18 is closed. In FIG. 2, the switching claws on the wheel are a component of a sliding sleeve 60 which is arranged on an insertion tooth arrangement of the intermediate shaft 48 in a rotationally secure manner but in an axially displaceable manner. The switching claws on the axle are constructed on a carrier ring 46 which is supported on the shaft portion 10 on the axle in a rotationally secure manner but in an axially displaceable manner via an insertion tooth arrangement. The carrier ring 46 is supported at the side thereof opposite the claws on the wheel by an overload spring 62 against the shaft portion 10 on the axle.

The sliding sleeve 60 which is axially displaceably arranged on the intermediate shaft 48 can be actuated in FIG. 2 via an actuator 64 which, for example, is in the form of an electric motor. The actuator 64 is drivingly connected via a self-locking gear stage to an actuator sleeve 65. This actuator sleeve 65 is arranged on a cylindrical sliding sleeve external circumference. For uncoupling the rotation from the sliding sleeve 60 which rotates during operation, the actuator sleeve 65 is supported via two roller bearings on the cylindrical sliding sleeve external circumference.

In FIG. 2, the shaft portion 10 on the axle is in the form of a hollow shaft, the hollow-cylindrical internal profile of which forms a lubricant channel 40 which will be described below. Similarly, the intermediate shaft 48 is also in the form of a hollow shaft. Furthermore, the intermediate shaft 48 has a bearing journal 66 which has a reduced diameter and which is supported via a pilot bearing 68 on the internal circumference of the shaft portion 10 on the axle.

In FIG. 2, the intermediate shaft 48 is closed on the side thereof facing the clutch in order to avoid an oil discharge from the axle when an inserted articulated shaft is pulled (as illustrated in FIG. 2). Where applicable, the intermediate shaft 48 may also be open at the side thereof facing the clutch in order to lubricate the aligned gearing arrangement.

The compensation housing 49 which rotates during operation is rotatably supported via a rotary bearing 69 in an axle differential housing 71. According to FIG. 2, the axle differential housing 71 has a shaft introduction opening 73, through which the shaft portion 10 on the axle is guided. The shaft introduction opening 73 of the axle differential housing 71 is sealed in a substantially lubricant-tight manner via two axially spaced-apart annular seals 75 which are supported in a radial direction between the shaft introduction opening 73 and the shaft portion 10 on the axle. Furthermore, in FIG. 2 the lubricant channel 40 is connected via a transverse channel 79 to an annular gap 81 which extends between the two adjacent annular seals 75. The annular gap 81 forms a lubricant pressure chamber which is connected via a supply line 83 to a lubricant supply 85. The separation clutch supply line 45 is again connected to the lubricant supply 85.

In FIG. 2, consequently, the lubricant channel 40 of the shaft portion 10 opens both into the clutch chamber 57 of the separation clutch 18 and into the housing interior 50 of the compensation housing 49. The lubricant channel opening facing the axle differential 23 and the lubricant channel opening facing the clutch chamber 57 are positioned in axial alignment with each other. Furthermore, the two channel openings have identical flow cross sections. In this manner, during lubricant operation a substantially uniform lubricant supply to the axle differential 23 and to the separation clutch 18 can be ensured. In FIG. 2, the lubricant channel opening which faces the clutch chamber 57 is constructed in an aperture 77.

It should be emphasized that the flow cross sections do not necessarily have to be identical, for example, when a 50:50 division is not desired or necessary. That is to say, the flow cross sections can also be varied in a selective manner in order to have an influence on the volume flow division. Thus, for example, the aperture diameter (that is to say, internal diameter) of the two apertures 77 and 78 may be selected to be of different sizes. The total oil volume flow in the lubricant channel 40 can therefore be selectively divided by the apertures 77 and 78.

As already mentioned above, by using the apertures 77, 78 the oil volume flow in the hydraulic circuit can be divided for the different components. The aperture 78 can be implemented in different embodiments. For example, a grub screw which reproduces the aperture geometry internally and which is screwed into the shaft portion 8 on the axle at the side facing the differential can be used. The aperture 77 can also be produced in different embodiments. For example, it may be in the form of a screw which reproduces a corresponding aperture geometry internally and which is screwed in from the side facing the clutch. Alternatively, the aperture can be pressed in (for example, during large-scale production) or be drilled directly into the shaft.

Since the oil pressure for rotor internal cooling/gear mechanism lubrication is not so high, the apertures 77 and 78 which are arranged in the shaft portion 10 on the axle are advantageous for the oil volume flow division because thus an even greater pressure is applied in the annular gap 81 in order to obtain the oil from the annular gap 81 into the shaft portion 10 on the axle.

The above-described clutch components are all arranged in a clutch housing 76 in FIG. 2. The lubricant 31 which flows from the clutch components of the separation clutch 18 is collected in a lubricant sump 80 of the clutch housing 76 which is connected to the lubricant sump 33 in technical flow terms. In this manner, an immersion lubrication can be carried out, wherein the clutch components which also rotate during operation can be introduced into the lubricant sump 80 which is connected to the lubricant sump 33 in technical flow terms. As a result of the configuration of the clutch housing 76 itself or by correspondingly introduced blockage elements upstream of the discharge to the lubricant sump 33, it is possible to adjust the oil level in the clutch housing 76 in the event of an additionally desired immersion lubrication of the clutch components.

In FIG. 2, during travel operation the lubricant 31 is recirculated as follows in the separation clutch hydraulic circuit T. Thus, the lubricant 31 is initially conveyed via the lubricant supply 85 and via the supply line 83 into the lubricant pressure chamber 81. From there, the lubricant 31 is directed radially inwardly into the lubricant channel 40 of the shaft portion 10 on the axle. The lubricant 31 located in the lubricant channel 40 flows past the front side 55 of the shaft portion 10 into the housing interior 50 of the axle differential 23, from where it is urged outward as a result of centrifugal force, with the axle differential components becoming lubricated. The lubricant 31 which flows out of the axle differential 23 is subsequently collected in the lubricant sump 33 (FIG. 1). At the same time, the lubricant 31 is conveyed out of the lubricant channel 40 into the clutch chamber 57. The lubricant 31 which flows out of the clutch housing 76 is subsequently collected in the lubricant sump 33.

In the exemplary embodiment shown, the lubricant 31 cannot be directed into the internal profile of the intermediate shaft 48 because otherwise lubricant 31 is discharged out of the unit when the articulated shaft is pulled. Where applicable, the lubricant 31 can also be directed via a lubricant opening (not shown) in the bearing journal 66 of the intermediate shaft 48 into the intermediate shaft internal profile in order to allow a lubricated aligned gearing arrangement.

The outflow of the lubricant from the differential 23 is advantageously brought about downstream of the axle shaft bevel gears 52 (that is to say, between axle shaft bevel gear 52 and hub portion 56 of the compensation housing 49). Between the axle shaft bevel gears 52 and the compensation housing 49, there are located start-up discs which also have to be well lubricated. If the lubricant 31 is discharged at that location, it can be ensured that these locations are well lubricated. To this end, the compensation housing 49 must otherwise naturally be closed (or closed as far as possible) and may not have any (relatively large) openings. Thus, it is ensured that the lubricant reaches by centrifugal force the locations which are intended to be lubricated on the differential pin and start-up locations of the axle shaft bevel gears 52.

Alternatively to FIG. 2, the shaft portion 10 on the axle may not be in the form of a hollow shaft but may instead be in the form of a semi-hollow shaft, in which the lubricant 40 is closed in the direction toward the axle differential 23. In this manner, only an internal lubrication of the separation clutch 10 is carried out, but not an internal lubrication of the compensation differential 23.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

LIST OF REFERENCE NUMERALS

1 Electric machine
2 Electric machine housing
3 Flange shafts
4 Stator
5 Rotor hollow shaft
6 Gear mechanism input shaft
7 Gear mechanism arrangement
8 Housing walls
9 Shaft portion on wheel
10 Shaft portion on axle
11 Fixed gear
13 Intermediate shaft
15 Fixed gear
17 Fixed gear
18 Separation clutch
19 Branching location
21 Gear at input
23 Axle differential
25 Lubricant tank
26 Branching location
27 Suction line
29 Pressure pump
30 Gear mechanism supply lines
31 Lubricant
32 Pressure line
33 Lubricant sump
35 Return pump
37 Return line
39 Venting line
40 Lubricant channel
43 Lubricant level
41 Tank interior
46 Carrier ring
47 Pump control device
48 Intermediate shaft
49 Compensation housing
50 Housing interior
51 Compensation bevel gear
52 Axle bevel gear
54 Articulated shaft
55 Front sides
56 Hub portions
57 Clutch chamber 58 Double pump
59 Electric machine supply line
60 Sliding sleeve
61 Common drive shaft
62 Overload spring
63 Electric motor
64 Actuator
65 Actuator sleeve
66 Bearing journal of intermediate shaft with reduced diameter
67 Lubricant outflow
68 Pilot bearing
69 Rotary bearing
71 Axle differential housing
73 Shaft introduction opening
75 Annular seals
76 Clutch housing
77, 78 Apertures
79 Transverse channel
80 Lubricant sump
81 Annular gap
83 Supply line
85 Lubricant supply
FA Vehicle axle
G Gear mechanism hydraulic circuit
R Rotor hydraulic circuit
T Separation clutch hydraulic circuit
Z1, Z2 Tooth engagement locations.

The invention claimed is:

1. An electrically operated vehicle comprising:
a drive apparatus having at least one electric machine which outputs power to at least one vehicle wheel via a gear mechanism arrangement, the gear mechanism arrangement including an axle differential which is drivingly connected to the at least one vehicle wheel at the output at both sides via flange shafts, wherein one of the flange shafts is divided into a shaft portion on the at least one wheel and a shaft portion on the axle, which can be connected to each other via a separation clutch; and
a lubricant supply system including
a pressure pump,
an electric machine hydraulic circuit in which a lubricant tank is connected via a suction line to the pressure pump which conveys lubricant to the electric machine via an electric machine supply line,
a gear mechanism hydraulic circuit configured to convey the lubricant to the gear mechanism arrangement,
wherein the pressure pump is associated as a common pressure pump with both the electric machine hydraulic circuit and the gear mechanism hydraulic circuit, the pressure pump to recirculate the lubricant both in the electric machine hydraulic circuit and in the gear mechanism hydraulic circuit when the pressure pump is operating,
a lubricant sump common to both the electric machine hydraulic circuit and the gear mechanism hydraulic circuit,
a return pump common to both the electric machine hydraulic circuit and the gear mechanism hydraulic circuit,
a separation clutch hydraulic circuit configured to supply the lubricant to the separation clutch, and
at least one separation clutch supply line to guide the lubricant to the separation clutch,
wherein the lubricant which flows away from the separation clutch is collected in the common lubricant sump.

2. The electrically operated vehicle as claimed in claim 1, wherein the lubricant to be guided in at least one gear mechanism supply line to at least one gear mechanism lubrication location.

3. The electrically operated vehicle as claimed in claim 2, wherein the pressure pump is also associated with the separation clutch hydraulic circuit so that the electrically operated vehicle is configured so that lubricant can also additionally be recirculated in the separation clutch hydraulic circuit when the pump is operating.

4. The electrically operated vehicle as claimed in claim 2, wherein the separation clutch hydraulic circuit is configured so that an internal lubrication of the separation clutch is carried out by the separation clutch hydraulic circuit, wherein a lubricant channel which opens at a front side of the shaft portion in a clutch chamber of the separation clutch is configured in one of the shaft portions.

5. The electrically operated vehicle as claimed in claim 2, wherein a pressure line leads away from the pressure pump and branches out at a branching location into the electric machine supply line and the gear mechanism supply line.

6. The electrically operated vehicle as claimed in claim 5, wherein the lubricant which drips from the gear mechanism lubrication location is collected in the lubricant sump and the lubricant which flows out of the electric machine is also collected in the lubricant sump and, from there, is guided back by the return pump into the lubricant tank.

7. The electrically operated vehicle as claimed in claim 6, wherein the pressure pump and the return pump form a double pump with a common drive shaft, and the common drive shaft is in driving connection with an electric motor which is controlled by a pump control device.

8. The electrically operated vehicle as claimed in claim 7, wherein the pressure pump is also associated with the separation clutch hydraulic circuit so that the electrically operated vehicle is configured so that lubricant can also additionally be recirculated in the separation clutch hydraulic circuit when the pump is operating.

9. The electrically operated vehicle as claimed in claim 6, wherein the pressure pump is also associated with the separation clutch hydraulic circuit so that the electrically operated vehicle is configured so that lubricant can also additionally be recirculated in the separation clutch hydraulic circuit when the pump is operating.

10. The electrically operated vehicle as claimed in claim 5, wherein the pressure pump is also associated with the separation clutch hydraulic circuit so that the electrically operated vehicle is configured so that lubricant can also additionally be recirculated in the separation clutch hydraulic circuit when the pump is operating.

11. The electrically operated vehicle as claimed in claim 5, wherein the pressure line, the gear mechanism supply line or the electric machine supply line has a branching location from which the separation clutch supply line branches.

12. The electrically operated vehicle as claimed in claim 5, wherein the separation clutch hydraulic circuit is configured so that an internal lubrication of the separation clutch is carried out by the separation clutch hydraulic circuit, wherein a lubricant channel which opens at a front side of the shaft portion in a clutch chamber of the separation clutch is configured in one of the shaft portions.

13. The electrically operated vehicle as claimed in claim 2, wherein the lubricant which drips from the gear mechanism lubrication location is collected in the lubricant sump and the lubricant which flows out of the electric machine is also collected in the lubricant sump and, from there, is guided back by the return pump into the lubricant tank.

14. The electrically operated vehicle as claimed in claim 13, wherein the pressure pump and the return pump form a double pump with a common drive shaft, and the common drive shaft is in driving connection with an electric motor which is controlled by a pump control device.

15. The electrically operated vehicle as claimed in claim 14, wherein the pressure pump is also associated with the separation clutch hydraulic circuit so that the electrically operated vehicle is configured so that lubricant can also additionally be recirculated in the separation clutch hydraulic circuit when the pump is operating.

16. The electrically operated vehicle as claimed in claim 13, wherein the pressure pump is also associated with the separation clutch hydraulic circuit so that the electrically operated vehicle is configured so that lubricant can also additionally be recirculated in the separation clutch hydraulic circuit when the pump is operating.

17. The electrically operated vehicle as claimed in claim 13, wherein the separation clutch hydraulic circuit is configured so that an internal lubrication of the separation clutch is carried out by the separation clutch hydraulic circuit, wherein a lubricant channel which opens at a front side of the shaft portion in a clutch chamber of the separation clutch is configured in one of the shaft portions.

18. The electrically operated vehicle as claimed in claim 1, wherein the pressure pump is also associated with the separation clutch hydraulic circuit so that the electrically operated vehicle is configured so that lubricant can also additionally be recirculated in the separation clutch hydraulic circuit when the pump is operating.

19. The electrically operated vehicle as claimed in claim 18, wherein the pressure line, the gear mechanism supply line or the electric machine supply line has a branching location from which the separation clutch supply line branches.

20. The electrically operated vehicle as claimed in claim 1, wherein the separation clutch hydraulic circuit is configured so that an internal lubrication of the separation clutch is carried out by the separation clutch hydraulic circuit, wherein a lubricant channel which opens at a front side of the shaft portion in a clutch chamber of the separation clutch is configured in one of the shaft portions.

* * * * *